United States Patent
Kim et al.

(10) Patent No.: US 8,648,271 B2
(45) Date of Patent: Feb. 11, 2014

(54) POSITION SWITCH AND CIRCUIT BREAKER HAVING THE SAME

(75) Inventors: In Kyum Kim, Chungcheongbuk-Do (KR); Kil Young Ahn, Daejeon (KR); Seung Pil Yang, Chungcheongbuk-Do (KR); Hong Ik Yang, Chungcheongbuk-Do (KR); Yong Tae Kim, Chungcheongbuk-Do (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 254 days.

(21) Appl. No.: 12/892,786

(22) Filed: Sep. 28, 2010

(65) Prior Publication Data

US 2011/0080238 A1    Apr. 7, 2011

(30) Foreign Application Priority Data

Oct. 7, 2009  (KR) .................. 10-2009-0095361

(51) Int. Cl.
*H01H 9/20*       (2006.01)
*H02B 11/00*      (2006.01)

(52) U.S. Cl.
USPC .................. 200/50.26; 200/332.1; 200/50.23

(58) Field of Classification Search
USPC ......... 361/605–609; 200/50.21, 50.23, 50.26, 200/332.1, 330, 331
See application file for complete search history.

(56) References Cited

U.S. PATENT DOCUMENTS

| | | | |
|---|---|---|---|
| 2,338,365 A * | 1/1944 | Thorp et al. | 200/332.1 |
| 3,121,144 A * | 2/1964 | Tjebben | 200/50.22 |
| 3,297,839 A | 1/1967 | Fradley et al. | |
| 4,236,189 A * | 11/1980 | Yosida | 200/50.26 |
| 4,477,702 A * | 10/1984 | Goldhammer | 200/61.62 |
| 5,206,468 A | 4/1993 | Kobayashi et al. | |
| 5,663,540 A * | 9/1997 | Inpyn | 200/332.1 |
| 5,684,282 A | 11/1997 | Castonguay et al. | |
| 5,780,792 A * | 7/1998 | Fritts et al. | 200/50.12 |

FOREIGN PATENT DOCUMENTS

| | | |
|---|---|---|
| CN | 1357902 | 7/2002 |
| CN | 101034792 | 9/2007 |
| JP | 63-198319 | 12/1988 |
| JP | 1-157513 | 10/1989 |
| JP | 9-35566 | 2/1997 |
| JP | 10-108324 | 4/1998 |
| JP | 11-178130 | 7/1999 |
| JP | 2002-17008 | 1/2002 |
| KR | 20080062866 | 7/2008 |

OTHER PUBLICATIONS

The State Intellectual Property Office of the People's Republic of China Application Serial No. 201010501227.6, Office Action dated Mar. 6, 2013, 6 pages.

* cited by examiner

*Primary Examiner* — Felix O Figueroa
(74) *Attorney, Agent, or Firm* — Lee, Hong, Degerman, Kang & Waimey

(57) ABSTRACT

A position switch and a circuit breaker having a position switch are provided. Contact plates, each having an elastically variable height, may be provided between switch blocks and switch levers. A testing contact plate and a running contact plate may compensate for inferior dimensioning of the switch blocks and the switch levers. Such a configuration may allow a position of a breaker body to be quickly and accurately displayed and, further, may prevent damage of the position switch provided at the breaker body. Furthermore, such a configuration may prevent any connection inferiority between a terminal of the breaker body and a terminal of a cradle.

10 Claims, 8 Drawing Sheets

POSITION SWITCH AND CIRCUIT BREAKER HAVING THE SAME

CROSS-REFERENCE TO A RELATED APPLICATION

Pursuant to 35 U.S.C. §119(a), this application claims the benefit of earlier filing date and right of priority to Korean Application No 10-2009-095361 filed on Oct. 7, 2009 the content of which is incorporated by reference herein in its entirety.

BACKGROUND OF THE INVENTION

1. Field of the Invention

The present invention relates to a position switch and a circuit breaker having the same, and particularly, to a position switch capable of precisely checking a position of a circuit breaker moving in a cradle from a remote distance as an electric signal, and a circuit breaker having the same.

2. Background of the Invention

Generally, a circuit breaker is classified into a fixed type and a withdrawable type. The fixed type circuit breaker has only a body, and is fixed to inside of a panel of a switchboard. On the contrary, the withdrawable type circuit breaker has an outer case such as a cradle for facilitation of maintenance and repair, and is configured to insert or withdraw only a breaker body thereinto or therefrom.

The withdrawable type circuit breaker (hereinafter, will be referred to as 'circuit breaker') is accommodated in a switchboard together with other electric devices so as to drive a power plant, a substation, an electric motor, etc.

The circuit breaker may be configured such that the breaker body thereof is electrically connected to or separated from the cradle fixed to a switchboard. According to an accommodation position of the breaker body in the cradle, a position of the circuit breaker may be categorized into a 'TEST' position and a 'RUN' position. More concretely, the 'TEST' position indicates a position where only an operation test for the circuit breaker can be performed as a bus bar terminal and a load terminal of the breaker body are separated from a bus bar terminal and a load terminal of the cradle. On the contrary, the 'RUN' position indicates a position where a voltage and a current can be supplied as the circuit breaker is connected to the terminals of the cradle.

FIG. 1 is a disassembled perspective view of a breaker body and a cradle of a circuit breaker in accordance with the conventional art, FIG. 2 is a perspective view of a carriage for moving a main circuit unit of the breaker body of FIG. 1, FIG. 3 is a perspective view of a position switch of the carriage of FIG. 2, and FIGS. 4 and 5 are side sectional views showing an operation of the position switch according to each position of the circuit breaker of FIG. 1.

As shown, the circuit breaker generally comprises a cradle 1, a breaker body 2, and a carriage 3.

The cradle 1 includes a horizontal frame unit 11 having the breaker body 2 thereon, and a vertical frame unit 12 having the bus bar terminal 13 and the load terminal 14, and coupled to the end of the horizontal frame unit 11 in a vertical direction.

An interlock plate 15 for interlocking the breaker body 2 according to each position ('TEST' position and 'RUN' position) of the breaker body 2 is installed at a front end of the horizontal frame unit 11, i.e., at the end in an insertion direction of the breaker body 2. On a side surface of the interlock plate 15, a testing switch block 16 and a running switch block 17 each configured to operate a position switch 31 to be later explained are installed with a predetermined gap therebetween in the insertion direction of the breaker body 2. The testing switch block 16 and the running switch block 17 are also installed to have a constant gap between switch bodies 35 and 36 to be later explained in a direction perpendicular to the insertion direction of the breaker body 2.

The breaker body 2 includes a current conduction unit, an insulation unit, and an extinguishing device.

The current conduction unit is implemented as contacts, and the contacts include a moveable contact of a bus bar terminal 21 and a fixed contact of a load terminal 22. The bus bar terminal 21 and the load terminal 22 are installed to face the bus bar terminal 13 and the load terminal 14 so as to have a test position by being separated from the bus bar terminal 13 and the load terminal 14 of the cradle 1, or so as to have a run position by being connected to the bus bar terminal 13 and the load terminal 14 of the cradle 1.

The insulation unit is formed of an epoxy mold or a bulk molding compound (BMC) resin.

The extinguishing device is configured to extinguish an arc generated when opening and closing contacts of a vacuum circuit breaker, and when breaking an accident current.

As shown in FIG. 2, the carriage 3 includes a mechanical mechanism for opening and closing contacts of the circuit breaker. At one side of the carriage 3, installed is a position switch 31 configured to check a position of the breaker body 2 by contacting the testing switch block 16 and the running switch block 17 of the cradle 1.

As shown in FIG. 3, the position switch 31 includes a switch housing 32, a testing switch 33 and a running switch 34, the switches arranged in a horizontal direction of the switch housing 32. The testing switch 33 and the running switch 34 include switch bodies 35 and 36, and switch levers 37 and 38 installed at lower ends of the switch bodies 35 and 36 and configured to operate the switch bodies 35 and 36 by being pressed with contacting the testing switch block 16 and the running switch block 17, respectively. The switch levers 37 and 38 are provided with rollers 37a and 38a at the ends thereof so as to slide on the testing switch block 16 and the running switch block 17.

Between the breaker body 2 and the carriage 3, further installed is an auxiliary device for normally operating the circuit breaker, e.g., a controller, an interlock device and an insertion/withdrawal device.

Unexplained reference numeral 15a denotes a test position determination recess, and 15b denotes a run position determination recess.

The operation of the conventional circuit breaker will be explained as follows.

Firstly, the carriage 3 having the breaker body 2 thereon is loaded on the cradle 1, and then the carriage 3 is pushed to a rear side of the circuit breaker. As a result, the position switch 31 coupled to the carriage 3 comes in contact with the testing switch block 16 and the running switch block 17 of the cradle 1, and transmits a current position of the breaker body 2 as an electric signal. More concretely, as shown in FIG. 4, once the testing switch lever 37 of the position switch 31 comes in contact with the testing switch block 16, the testing switch lever 37 is pressed while sliding on the testing switch block 16. This may cause the testing switch body 35 to generate a signal while being operated. Based on this generated signal, it is determined that the current position of the carriage 3, i.e., the current position of the breaker body 2 is a 'TEST' position. Here, the bus bar terminal 21 and the load terminal 22 of the breaker body 2 are not in a coupled state to the bus bar terminal 13 and the load terminal 14 of the cradle 1. Accordingly, the circuit breaker can perform only a testing operation without receiving power from the bus bar.

Next, once the carriage 3 moves to a rear side of the circuit breaker via the test position, the testing switch lever 37 of the cradle 1 is separated from the testing switch block 16. If the carriage 3 is pushed to be introduced into the circuit breaker in a state that the testing switch lever 37 has been separated from the testing switch block 16, as shown in FIG. 5, the running switch lever 38 of the running switch body 36 fixed to the carriage 3 comes in contact with the running switch block 17 installed at a rear side of the cradle 1. If the carriage 3 is continuously pushed, the running switch lever 38 is pressed by the running switch block 17 thus to operate the running switch body 36. As a result, it is checked that the current position of the circuit breaker 2 is a 'RUN' position. Once the breaker body 2 reaches the run position, the bus bar terminal 21 and the load terminal 22 of the breaker body 2 are in a coupled state to the bus bar terminal 13 and the load terminal 14 of the cradle 1. Accordingly, the circuit breaker can perform only a running operation by receiving power from the bus bar.

A withdrawing operation of the carriage 3 is performed in a reverse manner to the aforementioned inserting operation.

However, the conventional position switch of the circuit breaker has the following problems.

Firstly, the switch levers 37 and 38 are directly coupled to the switch bodies 35 and 36. Accordingly, if dimensioning of the switch blocks 16 and 17 and the switch levers 37 and 38 is inferior, a contact operation is not performed or the switch bodies 35 and 36 may be damaged. For instance, when the switch blocks 16 and 17 have a very low height, the switch levers 37 and 38 are not sufficiently lifted up in a pushing manner. This may cause a contact operation between the switch levers 37 and 38 and the switch bodies 35 and 36 not to be performed. On the contrary, when the switch blocks 16 and 17 have a very high height, the switch levers 37 and 38 are locked by the switch blocks 16 and 17 when the breaker body 2 is moving in the cradle 1 or when the breaker body 2 is turned on/off. This may cause damage of the switch bodies 35 and 36, or may cause the breaker body 2 to be lifted up. When the breaker body 2 is lifted up, the bus bar terminal 21 and the load terminal 22 of the breaker body 2 are not precisely coupled to the bus bar terminal 13 and the load terminal 14 of the cradle 1. This may cause a contact error.

SUMMARY OF THE INVENTION

Therefore, an object of the present invention is to provide a position switch capable of rapidly and precisely checking a position of a breaker body moving in a cradle by extending an error allowable range about dimensioning of switch blocks and switch levers, and a circuit breaker having the same.

To achieve these and other advantages and in accordance with the purpose of the present invention, as embodied and broadly described herein, there is provided a position switch, comprising: a switch housing; a switch body coupled to the switch housing, and configured to generate an electric signal; a switch lever rotatably hinge-coupled to the switch body, and configured to selectively operate the switch body according to a rotation direction; and a contact plate slidably coupled to the switch housing, and configured to rotate the switch lever in a pushing manner by being slid when receiving an external force at an end thereof.

To achieve these and other advantages and in accordance with the purpose of the present invention, as embodied and broadly described herein, there is also provided a circuit breaker having a position switch, the circuit breaker comprising: a cradle having a plurality of switch blocks with a predetermined interval; a breaker body moveably accommodated in the cradle, and configured to break an accident current; and a carriage configured to accommodate the breaker body disposed thereon in the cradle, and having a position switch at one side thereof, the position switch configured to generate an electric signal when the breaker body passes through each of the switch blocks of the cradle, wherein the position switch is configured to press contact plates by the switch blocks.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
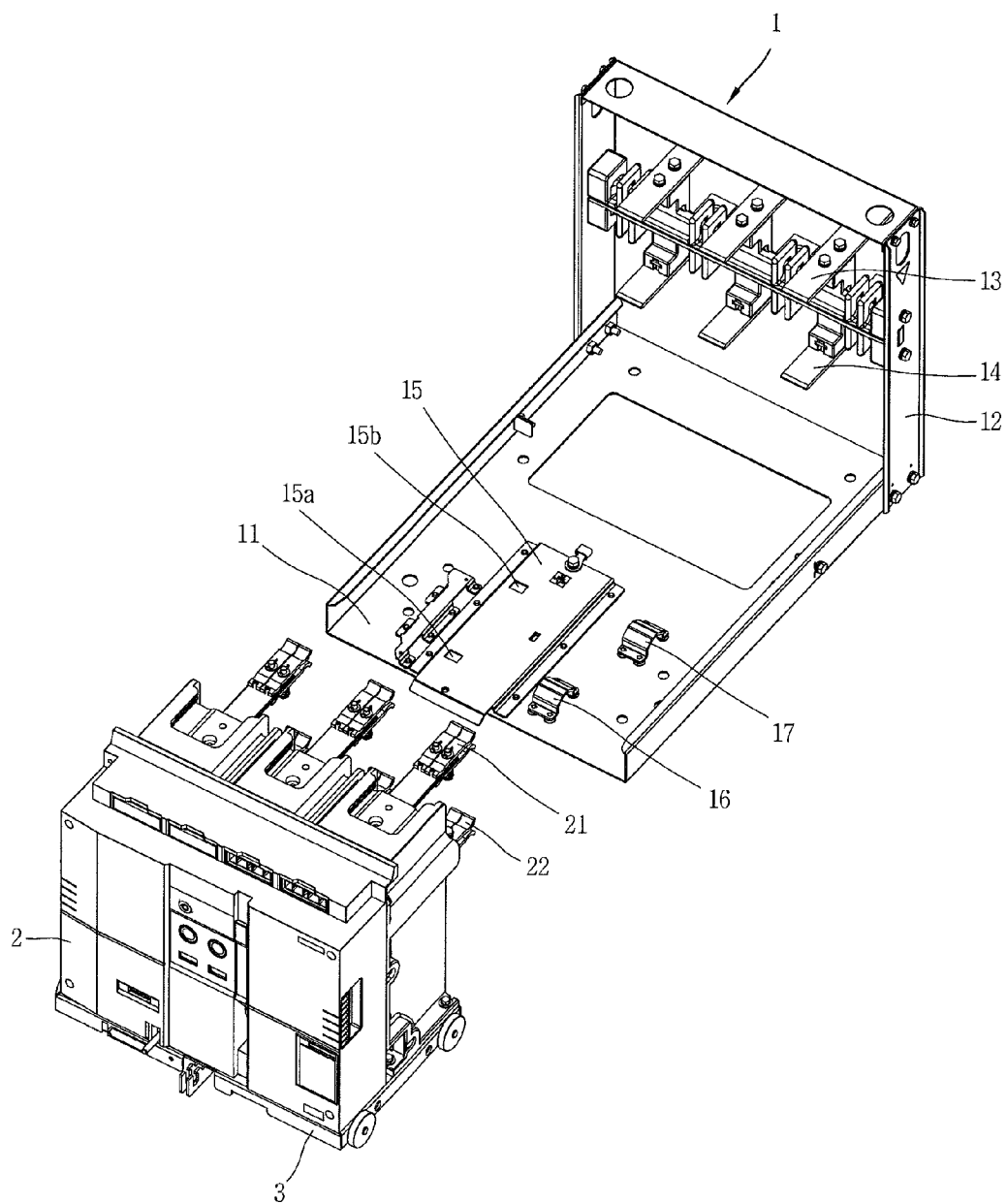
FIG. 1 is a disassembled perspective view of a breaker body and a cradle of a circuit breaker in accordance with the conventional art.

Description will now be given in detail of the present invention, with reference to the accompanying drawings.

For the sake of brief description with reference to the drawings, the same or equivalent components will be provided with the same reference numbers, and description thereof will not be repeated.

Hereinafter, a position switch and a circuit breaker having the same according to the present invention will be explained in more detail with reference to the attached drawings.

Explanations for the same parts as those of the conventional circuit breaker will be omitted, and the same reference numerals as those of the conventional circuit breaker will be given to the same parts of the present invention.

Figure 6:
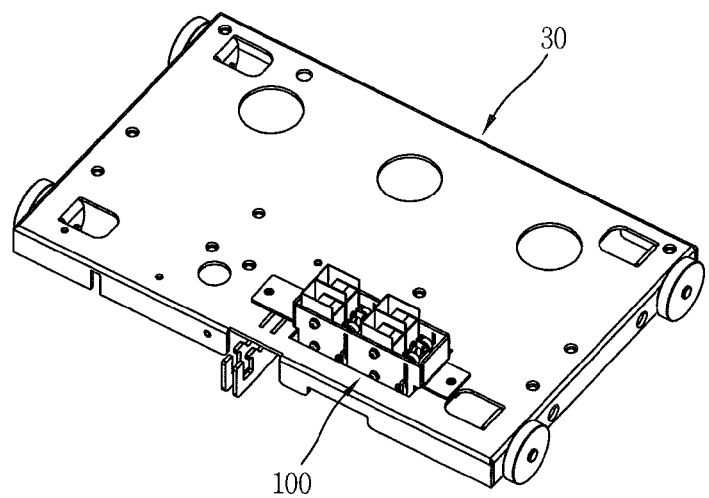
FIG. 6 is a perspective view of a carriage of a circuit breaker according to the present invention.
Figure 7:
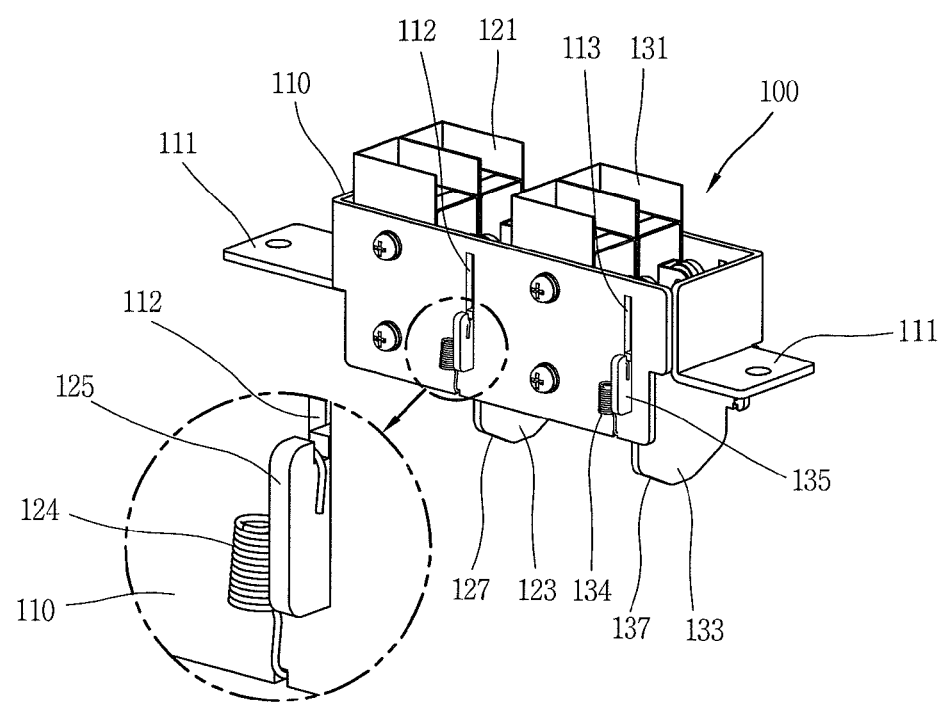
FIG. 7 is a perspective view of a position switch of the carriage of FIG. 6.
Figure 8:
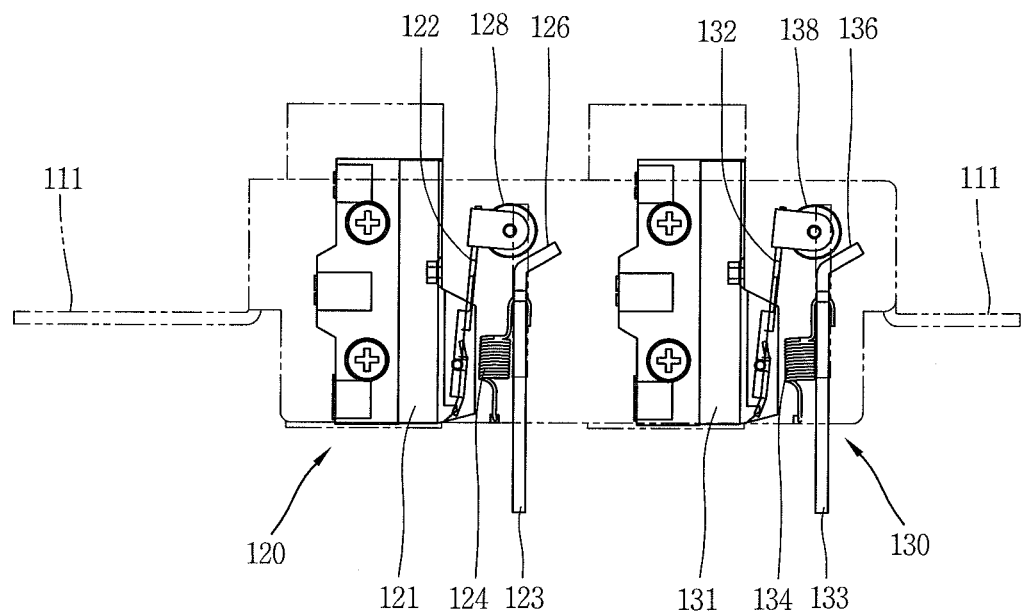
FIG. 8 is a frontal view of the position switch of FIG. 7.
Figure 9:
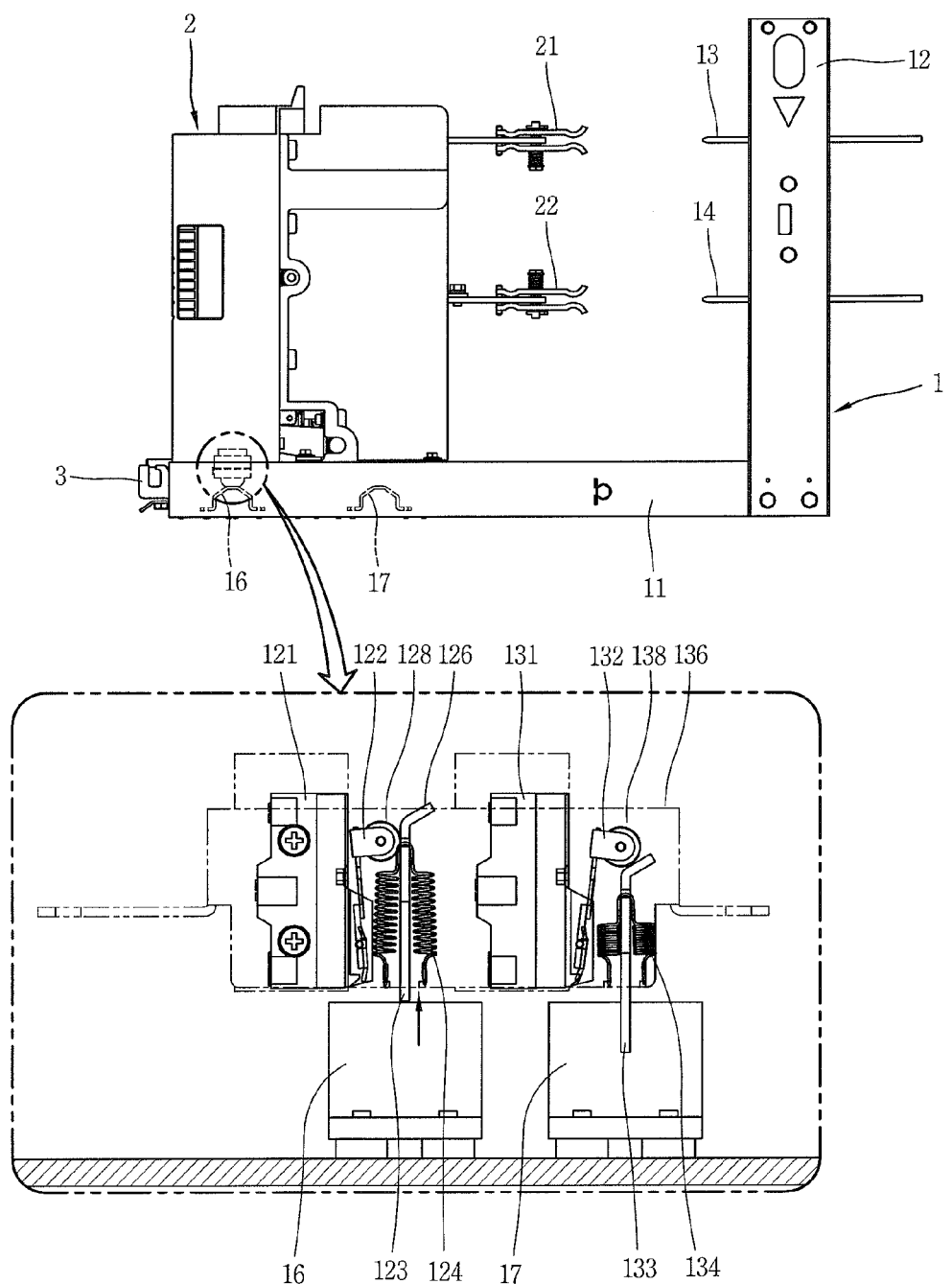
FIGS. 9 and 10 are side sectional views showing a switching operation of a beaker body with respect to the position switch of FIG. 7.
Figure 10:
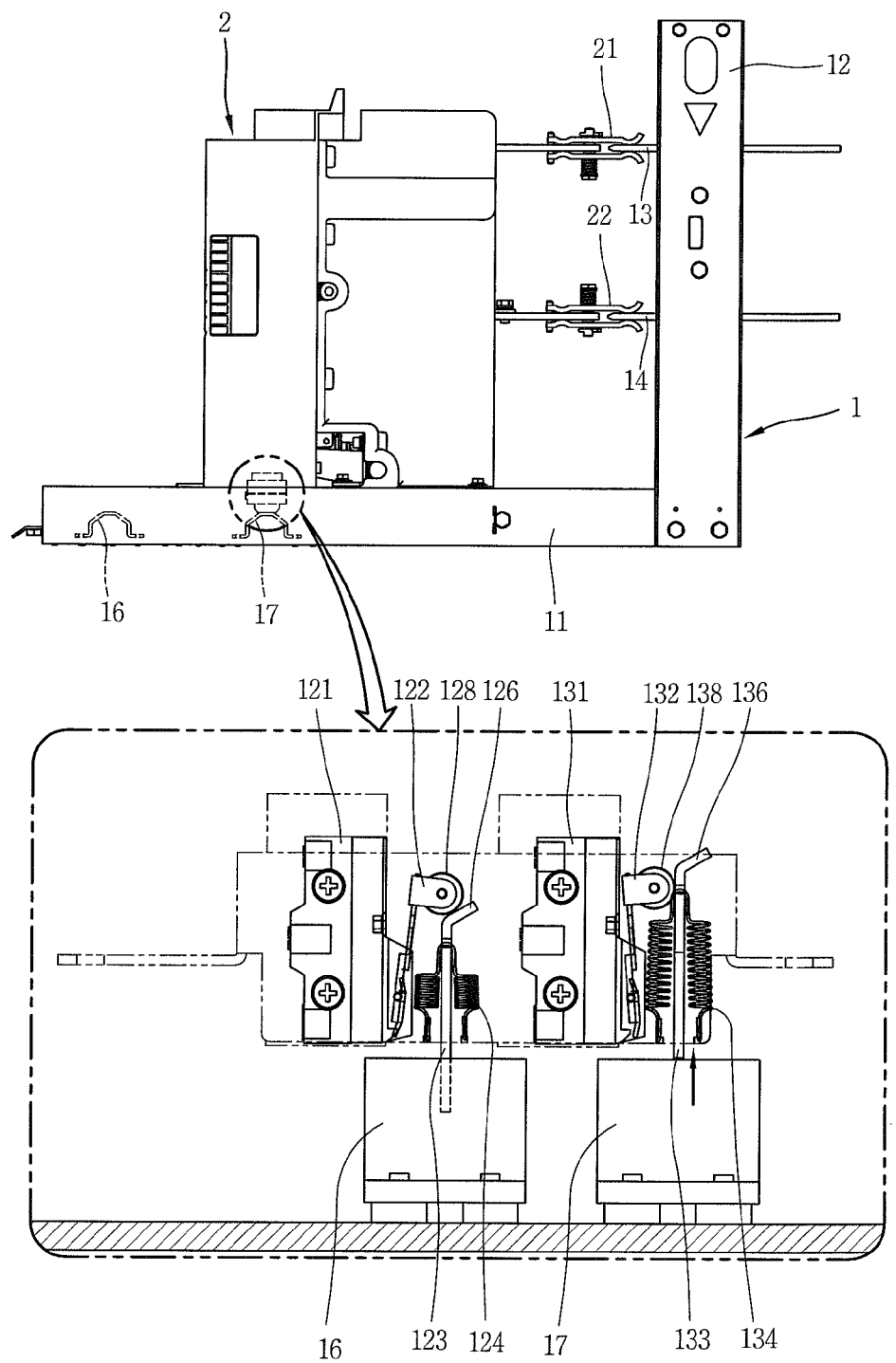

FIG. 6 is a perspective view of a carriage of a circuit breaker according to the present invention, FIG. 7 is a perspective view of a position switch of the carriage of FIG. 6, FIG. 8 is a frontal view of the position switch of FIG. 7, and FIGS. 9 and 10 are side sectional views showing a switching operation of a beaker body with respect to the position switch of FIG. 7.

Figure 2:
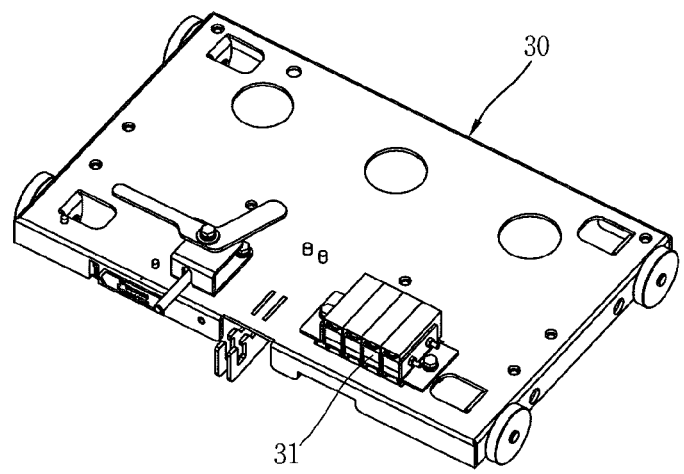
FIG. 2 is a perspective view of a carriage for moving a main circuit unit of the breaker body of FIG. 1.
Figure 3:
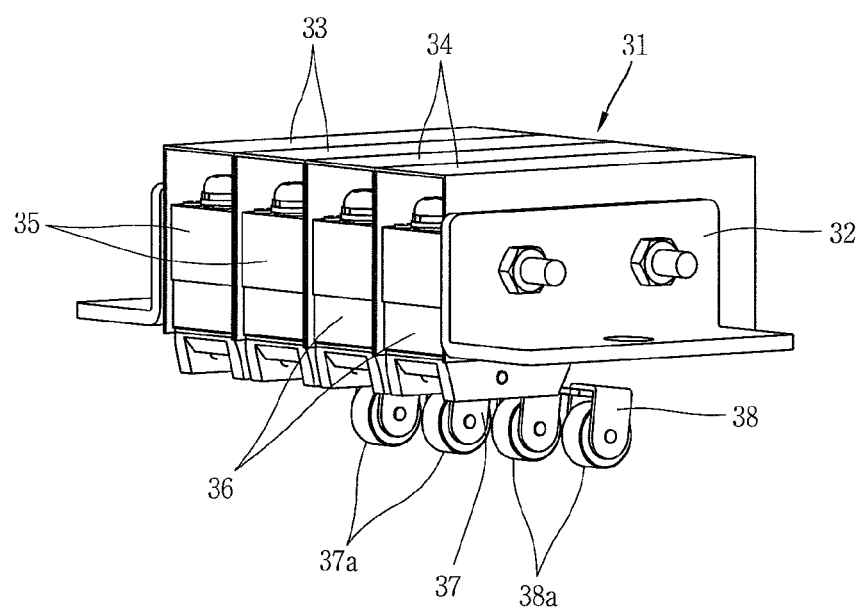
FIG. 3 is a perspective view of a position switch of the carriage of FIG. 2.
Figure 4:
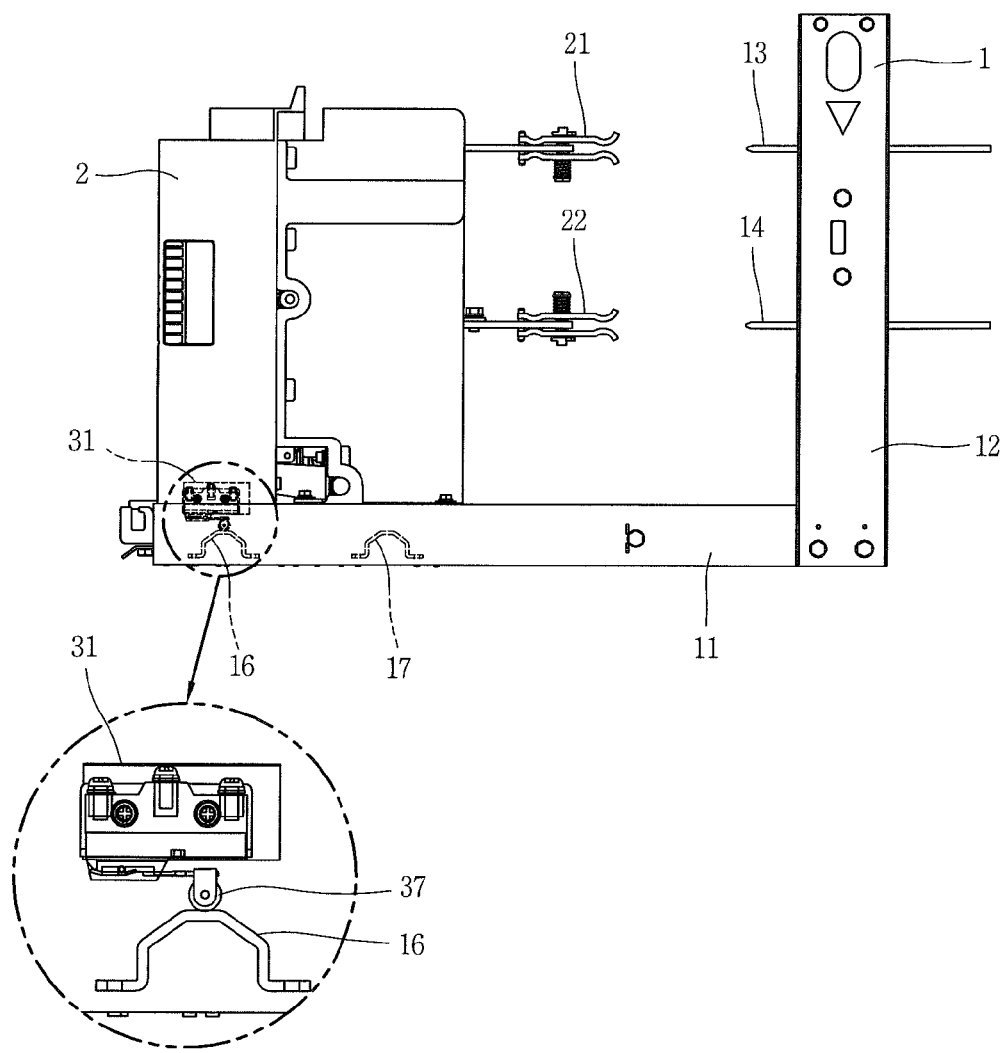
FIGS. 4 and 5 are side sectional views showing an operation of the position switch according to each position of the circuit breaker of FIG. 1.
Figure 5:
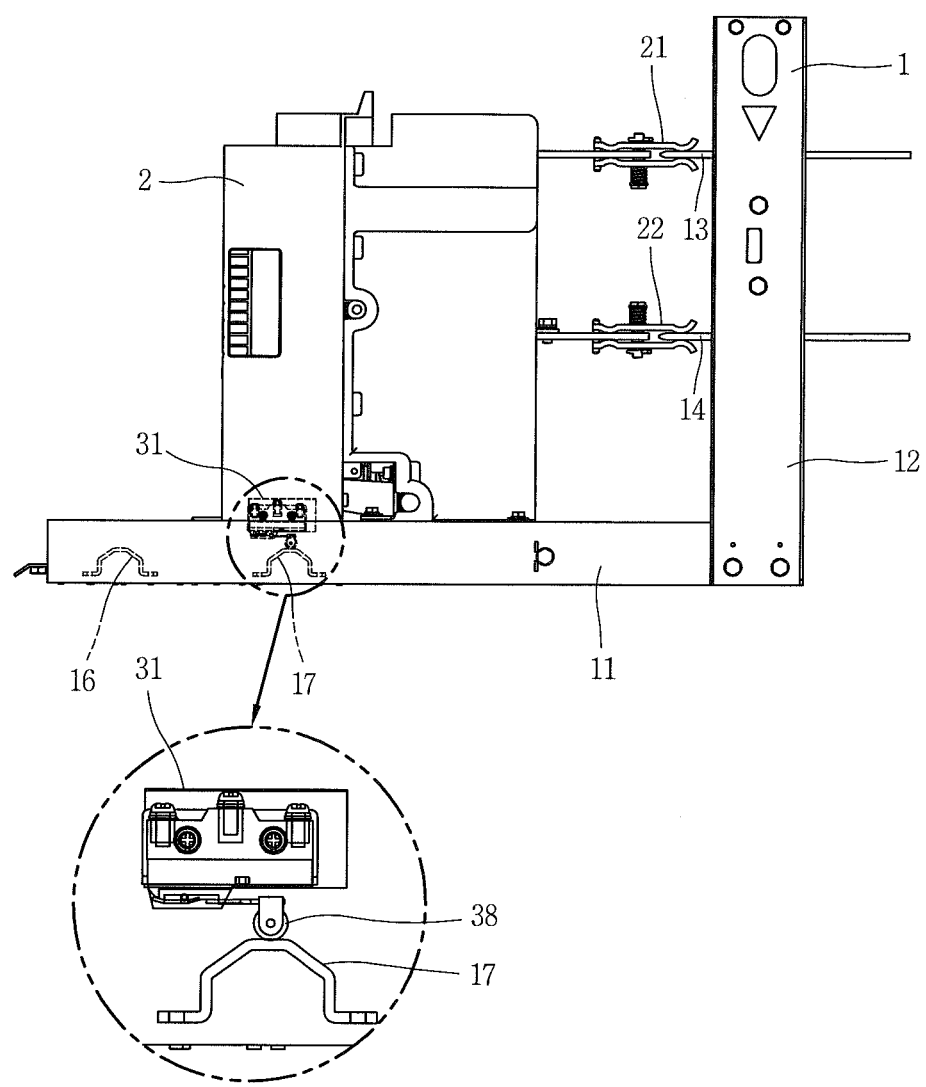

As shown in FIGS. 2 and 6, the circuit breaker according to the present invention comprises a testing switch block 16 and a running switch block 17 provided at a cradle 1, and a position switch 100 provided at a carriage 3, and configured to check a current position of the breaker body 2 by selectively generating an electric signal by the testing switch block 16 and the running switch block 17 of the cradle 1.

The testing switch block 16 and the running switch block 17 may be separately fabricated so as to be protruding from a horizontal frame unit 11 of the cradle 1 by a predetermined height, and then may be assembled to each other. Alternatively, the testing switch block 16 and the running switch block 17 may be integrally formed at the horizontal frame unit 11 of the cradle 1. Preferably, the testing switch block 16 and the running switch block 17 are provided in a direction perpendicular to a moving direction of the carriage 3, (hereinafter, will be referred to as 'vertical direction') with a predetermined interval, so as to press contact plates 123 and 133 to be later explained with a time interval with respect to the breaker body 2. Preferably, both side surfaces of the testing switch block 16 and the running switch block 17 contacting the contact plates 123 and 133, i.e., both side surfaces of the testing switch block 16 and the running switch block 17 which are in the moving direction are formed to be inclined or curved in a moving direction of the carriage 3, so that the contact plates 123 and 133 can contact thereto or smoothly slide.

The horizontal frame unit 11 of the cradle 1 is provided with an interlock plate 15 installed so as to have a long length in the moving direction of the carriage 3. At the interlock plate 15, formed are a test position determination recess 15a and a run position determination recess 15b with a predetermined interval in a moving direction of the carriage 3, so that an interlock link (not shown) provided at a front side of the carriage 3 can be selectively inserted at a test position or a run position of the breaker body 2. Preferably, the test position determination recess 15a and the run position determination recess 15b are formed to correspond to the testing switch block 16 and the running switch block 17, i.e., they are preferably formed at positions where a testing contact plate 123 and a running test plate 133 of the position switch 100 to be later explained contact the testing switch block 16 and the running switch block 17, respectively.

As shown in FIGS. 6 to 8, the position switch 100 comprises a switch housing 110, and a testing switch 120 and a running switch 130 installed in the switch housing 110 and turned on/off by the testing switch block 16 and the running switch block 17.

The switch housing 110 is formed in a rectangular shape, and has opened upper and lower surfaces. Bracket portions 111 are formed at both side surfaces of the switch housing 110 so as to be fixed to the carriage. A plurality of guide recesses, i.e., a testing guide recess 112 and a running guide recess 113 are formed on a front surface of the switch housing 110 so that guide protrusions 125 and 135 of the contact plates 123 and 133 to be later explained can be slidably inserted thereinto to be guided in upper and lower directions.

The testing switch 120 and the running switch 130 are formed in the same shape, and are operated in the same manner. Hereinafter, the testing switch 120 will be explained in more detail, and explanations about the running switch 130 will be omitted.

The testing switch 120 includes a testing switch body 121 fixedly-coupled to inside of the switch housing 110 and generating an electric signal, a testing switch lever 122 configured to selectively operate the testing switch body 121, a contact plate 123 configured to rotate the testing switch lever 122 in a pushing manner, and an elastic member 124 configured to restore the contact plate 123 to the original position when an external force applied to the contact plate 123 is removed.

The testing switch body 121 is fixedly-coupled to inside of the switch housing 110 on the same line as the running switch body 130 in a horizontal direction.

The testing switch is hinge-coupled to the testing switch body 121, and a contact roller 125 is coupled to the end of the testing switch lever 122 contacting the testing contact plate 123 so as to be rotated by the contact plate 123.

The testing contact plate 123 is slidably coupled to the switch housing 110 so as to be slidably moved towards an upper direction when receiving an external force at the end thereof, i.e., when being pressed at the time of passing through the testing switch block 16. For instance, the testing contact plate 123 is formed as a rectangular plate body having a long shape in upper and lower directions. A guide protrusion 125 is formed on a front surface of the testing contact plate 123 so as to be slidably coupled to the testing guide recess 112 of the switch housing 110. A contact portion 127 is curvedly-formed at an upper end of the testing contact plate 123 so as to press the switch lever 122 by contacting the contact roller 125 in a tangential direction. And, the testing contact plate 123 is provided with a guiding surface 127 at a lower end thereof. Here, the guiding surface 127 is inclined or curved in the moving direction of the carriage 3 so as to correspond to an inclined surface or a curved surface of the testing switch block 16.

The elastic member 124 is implemented as a tensile coil spring. One end of the elastic member 124 is fixed to a lower end of the switch housing 110 in a locked manner, whereas another end of the elastic member 124 is fixed to the guide protrusion 125 of the testing contact plate 123 in a locked manner. For this, the guide protrusion 125 of the testing contact plate 123 may be provided with an upwardly-inclined stopper at an end thereof.

Unexplained reference numeral 131 denotes a running switch body, 132 denotes a running switch lever, 133 denotes a running contact plate, 134 denotes a running elastic member, 135 denotes a contact roller, 136 denotes a guide protrusion of a running contact plate, and 137 denotes a guiding surface of the running contact plate.

The position switch and the circuit breaker having the same according to the present invention have the following operational effects.

In order to move the breaker body 2 to a test position inside the cradle 1 by an operator, as shown in FIG. 9, an interlock link (not shown) of the breaker body 2 is upwardly lifted, and the carriage 3 is pushed so that the breaker body 2 can reach the test position. Then, the interlock link is mounted to a test position determination recess 15a of the interlock plate 15 provided at the cradle 1. This position is a position where a bus bar terminal 21 and a load terminal 22 of the breaker body 2 are separated from a bus bar terminal 13 and a load terminal 14 of the cradle 1. At this position, only an operation test of the breaker body 2 is performed.

The testing contact plate 123 of the position switch 100 is lifted by the testing switch block 16 of the cradle 1, so that a contact portion 126 of the testing contact plate 123 comes in contact with the contact roller 125 of the testing switch lever 122. As the testing contact plate 123 is more lifted up, the testing switch lever 122 is upwardly moved a little to be counterclockwise rotated. Accordingly, a contact of the testing switch body 121 is operated. This may allow an operator to check, even from a remote distance, that the breaker body 2 is in a test position inside the cradle 1 by the operation of the testing switch body 121.

As shown in FIG. 10, in order to move the breaker body 2 to a run position inside the cradle 1 by the operator, the interlock link (not shown) is upwardly lifted to be separated from the test position determination recess 15a. At the same time, the carriage 3 is pushed to mount the interlock link at the run position determination recess 15b of the interlock plate 15. This position is a position where the bus bar terminal 21 and the load terminal 22 of the breaker body 2 are connected to the bus bar terminal 13 and the load terminal 14 of the cradle 1, and thus a current and a voltage are supplied to the breaker body 2. At the position, only an operation of the breaker body 2 is performed.

The running contact plate 133 of the position switch 100 is lifted by the running switch block 17 of the cradle 1. As a result, like the testing switch lever 122, the running switch lever 132 is lifted up in a pushing manner to be counterclockwise rotated. Accordingly, a contact of the running switch body 131 is operated. This may allow the operator to check, even from a remote distance, that the breaker body 2 is in a run position inside the cradle 1 by the operation of the running switch body 131.

An external force applied to the testing contact plate 123 is removed when the testing contact plate 123 is separated from the testing switch block 16. Accordingly, the testing contact plate 123 is restored to the original position by the elastic member 124 provided thereat.

As the contact plates having an elastically variable height are provided between the switch blocks and the switch levers, each of the testing contact plate 123 and the running contact plate 133 can compensate for inferior dimensioning of the switch blocks and the switch levers. This may allow a position of the breaker body to be rapidly and precisely displayed, and may prevent damage of the position switch provided at the breaker body. Furthermore, connection inferiority between the terminal of the breaker body and the terminal of the cradle can be prevented.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A position switch, comprising:
a switch housing having an interior and an exterior;
a plurality of switch bodies that are coupled to the switch housing, each switch body configured to generate an electric signal;
a plurality of switch levers each of which is rotatably hinge-coupled to a corresponding one of the plurality of switch bodies so as to correspond to the switch bodies, and configured to selectively operate the corresponding one of the plurality of switch bodies according to a rotation direction of the switch lever;
a plurality of contact plates that are slidably coupled to the switch housing and are located at the interior of the switch housing, each contact plate configured to cause one or more of the plurality of switch levers to rotate when the contact plate is pushed;
a plurality of elastic members each of which is configured to restore one of the plurality of contact plates to an original position when the contact plate is no longer pushed;
a plurality of guide recesses that are formed at the switch housing along a direction of movement of each of the contact plates; and
a plurality of guide protrusions, each extending from one of the plurality of contact plates and the interior of the switch housing through one of the plurality of guide recesses and connecting to an end of one of the plurality of elastic members at the exterior of the switch housing.

2. The position switch of claim 1, wherein an end of each of the plurality of switch levers comprises a contact roller that is configured to rotate.

3. The position switch of claim 2, wherein an end of each contact plates comprises a contact portion that is curved and formed such that the contact portion contacts a corresponding one or more of the contact rollers in a substantially tangential direction.

4. A circuit breaker including a position switch, the circuit breaker comprising:
a cradle including a plurality of switch blocks separated by a predetermined interval;
a breaker body configured to move and to be accommodated in the cradle, the breaker body further configured to break an accident current;
a carriage configured to accommodate the breaker body in the cradle, the carriage including a position switch that is located at one side of the carriage, the position switch configured to generate an electric signal when the breaker body passes through each of the plurality of switch blocks,
wherein the position switch comprises:
a switch housing having an interior and an exterior;
a plurality of switch bodies that are coupled to the switch housing, each switch body configured to generate an electric signal;
a plurality of switch levers each of which is rotatably hinge-coupled to a corresponding one of the plurality of switch bodies and configured to selectively operate the corresponding one of the plurality of switch bodies according to a rotation direction of the switch lever;
a plurality of contact plates that are slidably coupled to the switch housing and are located at the interior of the switch housing, each contact plate configured to cause one or more of the plurality of switch levers to rotate when the contact plate is pushed;
a plurality of elastic members each of which is configured to restore one of the plurality of contact plates to an original position when the contact plate is no longer pushed;
a plurality of guide recesses that are formed at the switch housing along a direction of movement of each of the contact plates; and
a plurality of guide protrusions, each extending from one of the plurality of contact plates and the interior of the switch housing through one of the plurality of guide recesses and connecting to an end of one of the plurality of elastic members at the exterior of the switch housing.

5. The circuit breaker of claim 4, wherein:
an end of each of the plurality of switch levers comprises a contact roller that is configured to rotate; and
an end of each of the plurality of contact plates comprises a contact portion that is curved and formed such that the contact portion contacts a corresponding one or more of the contact rollers in a substantially tangential direction.

6. The circuit breaker of claim 4, wherein:
the plurality of switch blocks are inclined or curved in a direction of movement of the carriage; and
an end of each of the plurality of contact plates is inclined or curved in order to contact a corresponding one of the plurality of switch blocks.

7. The circuit breaker of claim 4, wherein:
the plurality of contact plates are located in a direction that is perpendicular to a first direction of movement of the carriage; and
the plurality of switch blocks are located in a second direction that is perpendicular to the first direction of movement of the carriage.

8. The circuit breaker of claim 7, wherein the cradle comprises an interlock plate configured to restrict movement of the carriage.

9. The circuit breaker of claim 8, wherein the interlock plate comprises a plurality of position determining recesses configured to selectively insert an interlock link of the breaker body into the interlock plate.

10. The circuit breaker of claim 9, wherein each of the plurality of position determining recesses corresponds to one of the plurality of switch blocks.

\* \* \* \* \*